United States Patent
Heugel et al.

(10) Patent No.: US 10,416,623 B2
(45) Date of Patent: Sep. 17, 2019

(54) DEVICE FOR THE PRODUCTION OF A THREE-DIMENSIONAL OBJECT IN LAYERS

(71) Applicant: EOS GmbH Electro Optical Systems, Krailling (DE)

(72) Inventors: Martin Heugel, Landsberg am Lech (DE); Georg Fey, Munich (DE); Andreas Baumann, Graefelfing (DE); Hans Klingel, Moeglingen (DE)

(73) Assignee: EOS GmbH Electro Optical Systems, Krailling (DE)

( * ) Notice: Subject to any disclaimer, the term of this patent is extended or adjusted under 35 U.S.C. 154(b) by 687 days.

(21) Appl. No.: 14/423,662

(22) PCT Filed: Sep. 18, 2013

(86) PCT No.: PCT/EP2013/069361
§ 371 (c)(1),
(2) Date: Feb. 24, 2015

(87) PCT Pub. No.: WO2014/044705
PCT Pub. Date: Mar. 27, 2014

(65) Prior Publication Data
US 2015/0239177 A1    Aug. 27, 2015

(30) Foreign Application Priority Data

Sep. 18, 2012  (DE) .................. 10 2012 018 366

(51) Int. Cl.
*B29C 35/00* (2006.01)
*G05B 15/02* (2006.01)
(Continued)

(52) U.S. Cl.
CPC .......... *G05B 15/02* (2013.01); *B22F 3/1055* (2013.01); *B29C 37/0003* (2013.01);
(Continued)

(58) Field of Classification Search
CPC ....... B29C 64/00; B29C 64/153; B33Y 10/00; B33Y 30/00; B33Y 40/00
(Continued)

(56) References Cited

U.S. PATENT DOCUMENTS

| 5,252,264 A | 10/1993 | Forderhase et al. |
| 5,753,274 A | 5/1998 | Wilkening et al. |

(Continued)

FOREIGN PATENT DOCUMENTS

| DE | 19846478 A1 | 4/2000 |
| DE | 19937260 A1 | 2/2001 |

(Continued)

OTHER PUBLICATIONS

RU Office Action for Application No. 2015109284 dated Aug. 7, 2017, 6 pages.
(Continued)

*Primary Examiner* — Joseph S Del Sole
*Assistant Examiner* — Thu Khanh T Nguyen
(74) *Attorney, Agent, or Firm* — Seyfarth Shaw LLP

(57) ABSTRACT

After the manufacturing of an object by layer-wise solidification from a powder, this object is displaced into a container together with the powder surrounding the object, and is closed by a plate, which is positioned below the object during the manufacturing of the object.

6 Claims, 3 Drawing Sheets

(51) Int. Cl.
*B22F 3/105* (2006.01)
*B29C 37/00* (2006.01)
*B33Y 30/00* (2015.01)
*B29C 64/153* (2017.01)
*B29C 64/35* (2017.01)
*B29C 35/08* (2006.01)

(52) U.S. Cl.
CPC ............ *B29C 64/153* (2017.08); *B29C 64/35* (2017.08); *B33Y 30/00* (2014.12); *B22F 2003/1056* (2013.01); *B29C 2035/0838* (2013.01); *Y02P 10/295* (2015.11)

(58) Field of Classification Search
USPC ...................................... 425/174.4, 215, 375
See application file for complete search history.

(56) References Cited

U.S. PATENT DOCUMENTS

| | | | |
|---|---|---|---|
| 6,554,600 | B1 | 4/2003 | Hofmann et al. |
| 6,824,714 | B1 | 11/2004 | Turck et al. |
| 6,932,935 | B1 | 8/2005 | Oberhofer et al. |
| 7,153,463 | B2 * | 12/2006 | Leuterer ............... B29C 64/153 264/113 |
| 2004/0025905 | A1 | 2/2004 | Ederer et al. |

FOREIGN PATENT DOCUMENTS

| | | |
|---|---|---|
| EP | 0734842 A1 | 10/1996 |
| RU | 2299787 | 5/2007 |
| WO | WO 1993/008928 A1 | 5/1993 |
| WO | WO 2001/014126 A1 | 3/2001 |
| WO | WO 2002/028568 A2 | 4/2002 |
| WO | 03026876 | 4/2003 |

OTHER PUBLICATIONS

RU Office Action for Application No. 2015109284 dated Jan. 9, 2018, 7 pages.
PCT International Preliminary Report on Patentability dated Mar. 24, 2015; 9 pages.
Dr. Ing. Andreas Gebhardt, "Rapid Prototyping: Werkzeug für schnelle Produktentwicklung," München/Wien, Hanser, 1996, 5 pages.
Gibson et al., "Additive Manufacturing Technologies, Rapid Prototyping to Direct Digital Manufacturing," Springer, 2010, 472 pages.
3D Systems, "Selective Laser Sintering," YouTube Video—Accessible at https://www.youtube.com/watch?v=gLxve3ZOmvc.
3D Systems, Inc, "SLS Systems User's Guide," Aug. 2004, 100 pages.
European Notice of Opposition for European Serial No. 2897781, filed Aug. 22, 2017, 8 pages.
Opposition to European Serial No. 2897781, filed Aug. 22, 2017, 14 pages.

* cited by examiner

DEVICE FOR THE PRODUCTION OF A THREE-DIMENSIONAL OBJECT IN LAYERS

TECHNICAL FIELD

The invention relates to a device for a layer-wise manufacturing of a three-dimensional object, and in particular to packaging of a finished object as well as a non-solidified powder surrounding the same.

PRIOR ART

When a three-dimensional body is manufactured in a layer-wise manner from a powder, the powder to be solidified is provided in a storage container. From such a storage container, a certain amount of powder is firstly supplied to a so-called applicator, and by means of this applicator, the powder is applied onto a carrier plate layer by layer.

The surface of the applied layer is called building area. By means of an energy source, predetermined areas of the applied powder layer are solidified. These solidified areas correspond to an associated cross section of the object to be manufactured within the just applied layer.

Subsequently, a new layer of powder is applied and corresponding areas associated with the respective cross section of the object to be manufactured are then solidified within this new layer. Commonly, a lowering of the carrier plate by an amount corresponding to a thickness of this layer is carried out prior to an application of a new layer. The building area is thus always located within the same plane.

The room, in which the carrier plate and the layers positioned on the same are capable of being lowered, is denoted as a construction space in this technical field. This construction space is laterally limited by walls. The bottom of the construction space is formed by the carrier plate.

The above described sequence of coating, solidifying and lowering is continued until the object to be generated is completely finished. The manufactured object is now located in the construction space surrounded by powder which has not been solidified.

From prior art document DE 198 46 478 A1 it is known to remove the complete construction space including the walls and the carrier plate from the laser-sintering machine.

From document WO 93/08928 A1 there is known a hat-like container above the building area, by which the manufactured object and the non-solidified powder surrounding the same can be removed from the construction space. The term hat-like container denotes an object, which surrounds a volume and which is open at one side, wherein the opening is commonly directed towards the bottom.

There is a disadvantage with respect to prior art according to WO 93/08928 A1 in view of the fact, that there is not disclosed a closure for the hat-like container.

As far as the powder represents a considerably valuable powder, for example a noble metal powder, a container without a closure is associated with a disadvantage, that powder may be lost without control.

Further, when using a container without a closure, a contamination of the inner spaces of the device with powder may occur. This may be particularly disadvantageous in cases, where different kinds of powder are sequentially used in one and the same machine, since remaining amounts of a powder used before may disadvantageously influence the properties of the object which is manufactured in this device afterwards.

Technical Object

It is an object of the invention to provide a device in which the manufactured object and the powder surrounding the same can be removed from a laser-sintering machine in a closed container, without the powder leaking from the container.

Technical Solution

This object is solved according to the invention by allowing the manufactured object and the powder surrounding the same to be displaced from the construction space into the hat-like container together with a closure element, and allowing the container to be closed using the closure element subsequently.

The considerations, which led to the present invention started from the perception, that due to the opening of the container directed towards the bottom it be-comes advantageously possible to package the manufactured objects and the powder surrounding the same into the container, and subsequently to securely close the container, within just one operation step. For this purpose, an arrangement is selected in an inventive manner, in which a plate serves as the closure element, which is positioned directly upon the carrier plate and thus coincidently below the object being manufactured.

In a preferred embodiment, the closure element has a cross section, which corresponds to the opening of the hat-like container.

In a further embodiment of the invention, the ground plate, which is mandatory when manufacturing objects made from a metal in a manner layer by layer, is used as the closure element for the hat-like container. Such a ground plate is described in document EP 0 734 842 A1, which is incorporated herein by reference.

Preferred Effects

By the arrangement of the closure element upon the carrier plate and thus below the manufactured objects in the building area, it is possible to coincidently use the drive, which is used for lowering the carrier plate, also with respect to the closure element for inserting the same into the hat-like container.

Since the opening of the hat-like container is directed towards the bottom, the packaging of the manufactured object together with the non-solidified powder and the closing of the container may be carried out by simple lifting of the complete unit comprising the closure element, the manufactured component and the surrounding, non-solidified powder within just one operation step.

When applying the invention to the layer-wise manufacturing of objects made from a metal, the ground plate may simultaneously serve in an advantageous manner as a closure element, such that a separate closure element may advantageously be omitted.

BRIEF DESCRIPTION OF THE DRAWINGS

In the following the invention is explained in more detail by means of three drawings.

Figure 1:
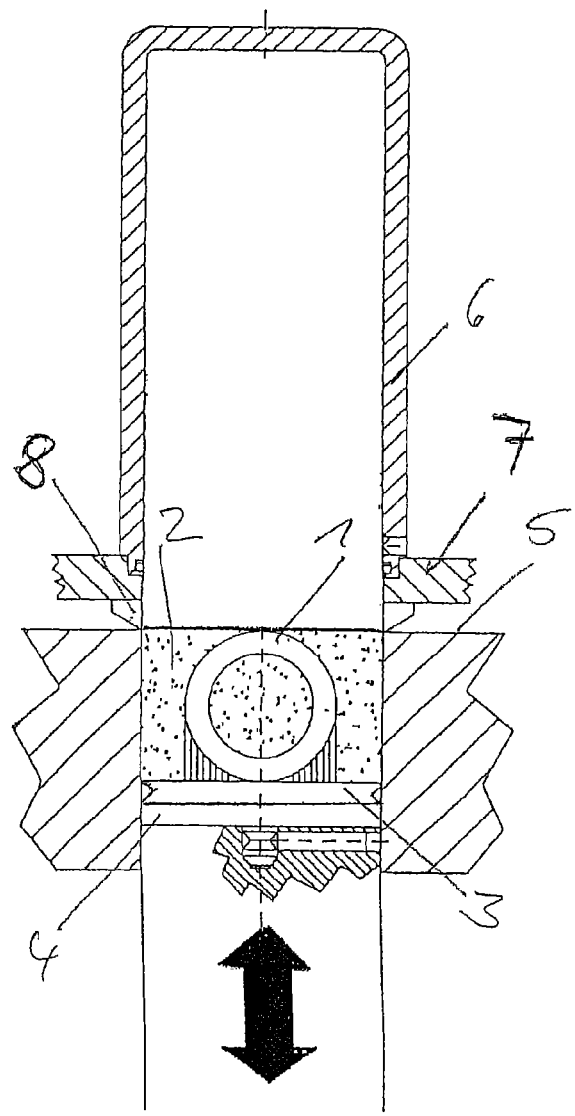
FIG. 1 shows in a cross sectional view a device according to the invention. The cutting line extends approximately axially centred through the building area.

The manufactured object 1 is constructed in a known manner on a ground plate 3 surrounded by a powder bed 2.

The ground plate 3 is adversely connected with a carrier plate 4. The connection between the ground plate 3 and the carrier plate 4 is formed as being detachable. In the illustrated view, the nature of the detachable connection is not illustrated in detail, since it is not relevant for the function of the present invention, which kind of detachable connection is actually applied. Form-fit or positive locking connections are possible as well as frictional or non-positive connections (for example adhesive, vacuum, or bayonet connections). The carrier plate 4 is provided to be movable up and down by means of a drive not illustrated.

Above the building plane 5 there is mounted a container 6. The container 6 is open on a side oriented towards the building plane, and has a cross section, which corresponds to the cross section of the building area. The container 6 is positioned with respect to the building plane 5, such that its inner wall is flush with the inner wall of the construction space.

The container 6 is seated in a holder 7, which is provided to be displaceable in a direction parallel to the building plane 5 by means of a drive not shown. During the manufacturing operation the container 6 is located outside of the beam path of the energy source serving for solidifying the powder.

Having completed the manufacturing operation, the container is positioned above the building area. For sealing, a circumferentially extending packing 8 is pro-vided, which seals the gap between the holder 7 and the building plane 5.

Figure 2:
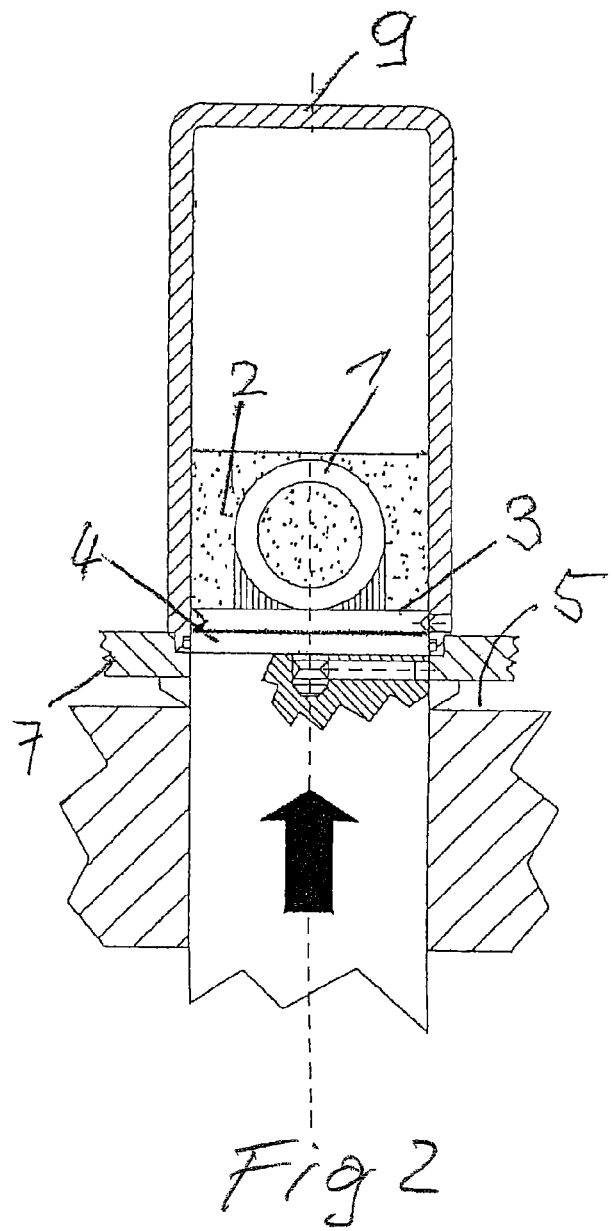

FIG. 2 shows the elements known from FIG. 1, wherein the ground plate 3 and the object 1 manufactured on this ground plate 3 is displaced vertically above into the container 6 in conjunction with the powder 2. Due to the insertion, a raise of air pressure may occur in the container 6, which may optionally be discharged through a valve 9 in a controlled manner.

Figure 3:
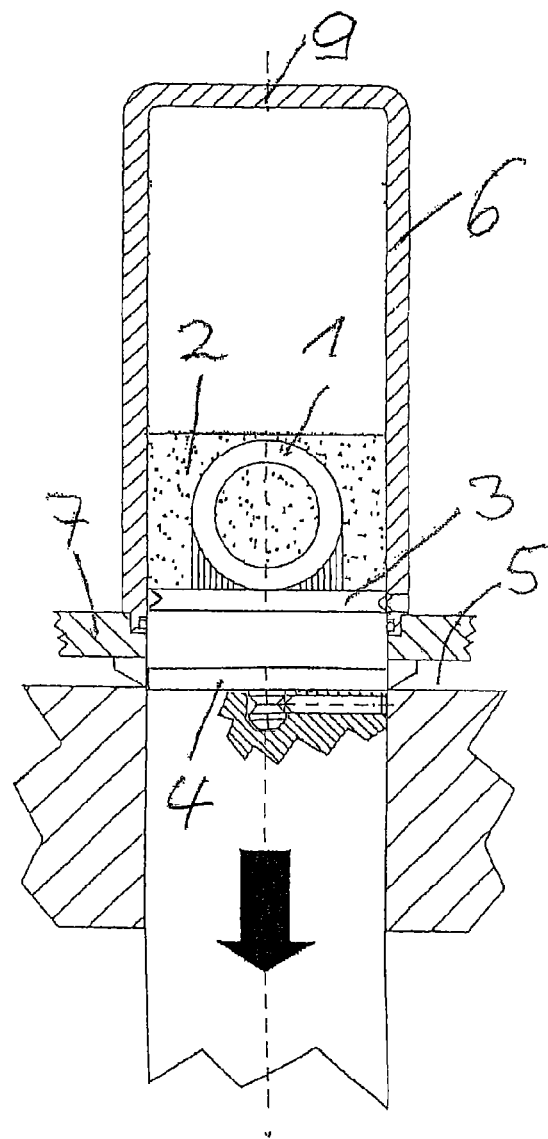

FIG. 3 shows a situation, after the carrier plate has been displaced vertically down again. For this purpose, the detachable connection between ground plate 3 and carrier plate 4 has been released before. The ground plate 3 remained in the container 6 due to friction between the outer edge of the ground plate 4 and the inner wall of the container 6.

The ground plate 3 is inserted into the container 6 such far, that the lower edge of container 6 may be flanged. This flanging reliably effects, that the ground plate 3 remains together with the manufactured object 1 or the powder 2 within the container 6 during a further transport.

In a preferred, not illustrated embodiment of the present invention, there is not provided a separate carrier plate. The drive, which has been provided in the previous embodiments for the lowering of the carrier plate, herein directly engages the closure element, such that a detachable connection is present between the closure element and the drive. In order to remove the container after completion of the object together with the object from the construction space, the container is closed with the closure element and subsequently, the detachable connection between the closure element and the drive is released.

INDUSTRIAL APPLICABILITY

The invention is industrially applicable upon the layer-wise manufacturing of objects.

The invention claimed is:

1. An improved apparatus for layer-wise manufacturing of a three-dimensional object within a construction space in which the three-dimensional object is manufactured, wherein the improvement comprises:
 a container which is separate from the construction space and which receives the manufactured object and a non-solidified powder surrounding the object upon completion of a build process, wherein the container surrounds a volume sufficient to receive therein the manufactured object and the non-solidified powder around the object upon completion of the build process while the object remains within the construction space, the container being open at its bottom so as to encompass a build area within which the object was constructed,
 a drive mechanism having a carrier plate, a build plate upon which the object is built being carried by the carrier plate, the carrier and build plates being separable from each other, the drive mechanism lowering the build plate within the construction space during the build process as layers are consecutively provided and solidified in layer-wise manufacture, and raising the build plate and carrier plate when the build process is completed, the container being adapted to be fit around the build plate while the build plate remains within the construction space whereby the manufactured object and the non-solidified powder surrounding the object can be moved into the container through the open bottom upon completion of the build process by the drive mechanism, the build plate being received in the container in sealing engagement therewith to close the open bottom, whereby the closed container with the manufactured object and the non-solidified powder therein is removable from the construction space leaving the drive mechanism and carrier plate within the construction space.

2. The apparatus according to claim 1, wherein the build plate has an area which substantially corresponds to the area of the open bottom of the container.

3. The apparatus according to claim 1, wherein the build plate is detachably arranged upon the carrier plate for layer-wise manufacturing of the three-dimensional object, and the container is closed on all sides, top and bottom when the build plate is received in the container.

4. The apparatus according to claim 1, wherein the drive mechanism, by which the object is lowered step by step during the layer-wise manufacturing, directly engages the build plate.

5. A device for removing an object which has been built through additive manufacture in layer-wise build-up of a powder build material, the object and non-solidified powder being contained within a construction space having a planar build area at an upper end of the construction space, comprising:
 a removable container having an open bottom, the container having an interior volume sufficient to receive the manufactured object and surrounding non-solidified powder upon completion of the build process, the container being separate from the construction space and not being employed during the build process,
 a drive mechanism for moving a build plate which is received within the construction space, the drive mechanism moving the build plate downwardly relative to the build area during manufacture, and upwardly at the conclusion of manufacture,
 the container being adapted so as to fit with its open bottom over the build area to receive the build plate, such that the drive mechanism can insert the object on the build plate and surrounding non-solidified powder within the container through the open bottom with the object and surrounding non-solidified powder still within the construction space, and
 a closure for the open bottom closing the container bottom upon inserting the object and surrounding non-solidified powder therein, wherein the container is removable from the construction space upon closing.

6. The device of claim 5, wherein the carrier plate is part of the drive mechanism, and the build plate is the closure when placed in sealing engagement with the container to thereby close the container open bottom.

\* \* \* \* \*